US012217892B2

(12) United States Patent
Oishi

(10) Patent No.: US 12,217,892 B2
(45) Date of Patent: Feb. 4, 2025

(54) COIL COMPONENT

(71) Applicant: Murata Manufacturing Co., Ltd., Kyoto-fu (JP)

(72) Inventor: Masayuki Oishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 679 days.

(21) Appl. No.: 17/488,025

(22) Filed: Sep. 28, 2021

(65) Prior Publication Data

US 2022/0108822 A1 Apr. 7, 2022

(30) Foreign Application Priority Data

Oct. 7, 2020 (JP) ................................ 2020-169776

(51) Int. Cl.

| | |
|---|---|
| ***H01F 5/00*** | (2006.01) |
| ***H01F 17/00*** | (2006.01) |
| ***H01F 27/28*** | (2006.01) |
| ***H01F 41/04*** | (2006.01) |

(52) U.S. Cl.

CPC ..... *H01F 17/0013* (2013.01); *H01F 27/2823* (2013.01); *H01F 41/041* (2013.01); *H01F 2017/0066* (2013.01)

(58) Field of Classification Search

USPC .......................................................... 336/200

See application file for complete search history.

(56) References Cited

U.S. PATENT DOCUMENTS 8,310,805 B2 * 11/2012 Tashima ............... H01G 4/2325 361/321.2
2004/0084131 A1 * 5/2004 Konoue ................ H01F 41/046 156/89.12
2011/0187487 A1 * 8/2011 Hsu ......................... H01L 28/10 336/200
2012/0326827 A1 * 12/2012 Nanjyo ............... H01F 17/0033 336/200

(Continued)

FOREIGN PATENT DOCUMENTS

CN 107622861 A 1/2018
JP H04-239107 A 8/1992

(Continued)

*Primary Examiner* — Ronald Hinson

(74) *Attorney, Agent, or Firm* — Studebaker & Brackett PC

(57) ABSTRACT

A coil component is capable of reducing specific resistance of a coil and reliably mitigating stress. A coil component includes a base body and a coil disposed in the base body. The base body includes a plurality of magnetic layers laminated in a first direction. The coil includes a plurality of coil wires laminated in the first direction. The coil wires extend along a plane orthogonal to the first direction. Each of the coil wires includes a first coil conductor layer and a second coil conductor layer laminated in the first direction. Specific resistance of the first coil conductor layer is smaller than specific resistance of the second coil conductor layer. Also, in a section orthogonal to an extending direction of each of the coil wires, the second coil conductor layer is adjacent to one side of the first coil conductor layer in the first direction, and a cavity portion is disposed in at least a part between the first coil conductor layer and one of the magnetic layers adjacent to another side of the first coil conductor layer in the first direction.

20 Claims, 11 Drawing Sheets

(56) References Cited

U.S. PATENT DOCUMENTS

| | | | | |
|---|---|---|---|---|
| 2013/0027168 | A1* | 1/2013 | Kim | H01F 27/28 336/200 |
| 2013/0038417 | A1* | 2/2013 | Kim | H01F 41/046 336/200 |
| 2014/0285307 | A1* | 9/2014 | Ishida | H01F 17/04 336/200 |
| 2017/0110236 | A1 | 4/2017 | Jang et al. | |
| 2018/0019052 | A1* | 1/2018 | Hashimoto | H01F 41/046 |
| 2018/0374636 | A1* | 12/2018 | Itani | H01F 27/24 |
| 2019/0311847 | A1* | 10/2019 | Yoshinaka | H01F 27/327 |
| 2020/0251273 | A1* | 8/2020 | Takai | H01F 27/292 |

FOREIGN PATENT DOCUMENTS

| | | | |
|---|---|---|---|
| JP | 2002-110425 | A | 4/2002 |
| JP | 2008-171853 | A | 7/2008 |
| JP | 2014-150096 | A | 8/2014 |
| JP | 2018-050015 | A | 3/2018 |
| JP | 2019-009211 | A | 1/2019 |

* cited by examiner

COIL COMPONENT

CROSS-REFERENCE TO RELATED APPLICATION

This application claims benefit of priority to Japanese Patent Application No. 2020-169776, filed Oct. 7, 2020, the entire content of which is incorporated herein by reference.

BACKGROUND

Technical Field

The present disclosure relates to a coil component.

Background Art

Conventionally, Japanese Patent Application Laid-Open No. 2014-150096 discloses a coil component. This coil component includes a laminate and a coil provided in the laminate. The laminate includes a plurality of insulator layers, and the coil includes a plurality of conductor patterns. The insulator layers and the conductor patterns are mutually laminated, and the plurality of conductor patterns are connected to form the coil.

The conductor pattern includes a conductor part formed from a conductor, and a different material part formed inside the conductor part with a material different from the conductor part. The thermal shrinkage of the different material part is smaller than the thermal shrinkage of the conductor part. Therefore, by adjusting the thermal shrinkage in the conductor pattern, local shrinkage of the conductor pattern is prevented. This suppresses local application of stress to the laminate.

SUMMARY

However, as in the conventional coil component, only forming the different material part in the conductor pattern has been insufficient to mitigate stress. As a result of earnest investigation, the present inventor of the present application has found that in order to mitigate stress at an insulator layer (laminate) and a conductor pattern (coil), cutting mechanical junction at a boundary portion between an insulator layer and a conductor pattern is most effective.

Therefore, the present disclosure provides a coil component capable of reducing specific resistance of a coil, and reliably mitigating stress.

A coil component according to one aspect of the present disclosure includes a base body; and a coil disposed in the base body. The base body includes a plurality of magnetic layers laminated in a first direction, and the coil includes a plurality of coil wires laminated in the first direction. The coil wires extend along a plane orthogonal to the first direction, and each of the coil wires includes a first coil conductor layer and a second conductor layer laminated in the first direction. Specific resistance of the first coil conductor layer is smaller than specific resistance of the second coil conductor layer. Also, in a section orthogonal to an extending direction of the coil wires, the second coil conductor layer is adjacent to one side of the first coil conductor layer in the first direction, and a cavity portion is disposed in at least a part between the first coil conductor layer and one of the magnetic layers adjacent to another side of the first coil conductor layer in the first direction.

According to the aspect, each coil wire includes the first coil conductor layer and the second coil conductor layer laminated in the first direction, whereby specific resistance of the coil can be reduced. Since the cavity portion is disposed in at least a part between the first coil conductor layer and the magnetic layer adjacent to the other side of the first coil conductor in the first direction, mechanical junction with the magnetic layer can be cut in at least a part of the other surface of the coil wire in the first direction. Accordingly, stress generated due to a difference in linear expansion coefficient between the magnetic layer and the coil wire can be reliably mitigated.

Preferably, in one exemplary embodiment of the coil component, in the section, the second coil conductor layer is divided into a plurality of parts, and the cavity portion is present between the parts adjacent to each other.

According to the exemplary embodiment, a region of the cavity portion can be enlarged, whereby stress can be more reliably mitigated.

Preferably, in one exemplary embodiment of the coil component, in the section, a ratio of a sectional area of the second coil conductor layer to a sectional area of the first coil conductor layer is less than or equal to 100%.

Here, the second coil conductor layer may be one part, or may be divided into a plurality of parts. When the second coil conductor layer is divided into the plurality of parts, the sectional area of the second coil conductor layer means a total sum of sectional areas of the plurality of parts.

According to the exemplary embodiment, the sectional area of the second coil conductor layer having large specific resistance can be reduced, whereby an increase in specific resistance of the coil wire can be suppressed.

Preferably, in one exemplary embodiment of the coil component, in the section, a cavity portion is disposed at a part between the second coil conductor layer and the magnetic layer adjacent to one side of the second coil conductor layer in the first direction.

According to the exemplary embodiment, a region of the cavity portion can be enlarged, whereby stress can be more reliably mitigated.

Preferably, in one exemplary embodiment of the coil component, in the section, a sectional area of the cavity portion between the first coil conductor layer and the magnetic layer adjacent to the first coil conductor layer is larger than a sectional area of a cavity portion between the second coil conductor layer and the magnetic layer adjacent to the second coil conductor layer.

Also, each of the cavity portion between the first coil conductor layer and the magnetic layer and the cavity portion between the second coil conductor layer and the magnetic layer may be one or may be divided into a plurality of parts. When the cavity portion is divided into the plurality of parts, and the sectional area of the cavity portion means a total sum of sectional areas of the plurality of parts.

According to the exemplary embodiment, the sectional area of the cavity portion is made different between one side and the other side of the coil wire in the first direction, thereby making a mitigation degree of stress stable, and making the impedance value/inductance value stable.

Preferably, in one exemplary embodiment of the coil component, in the section, the cavity portion is disposed at a part between the first coil conductor layer and the second coil conductor layer.

According to the exemplary embodiment, a region of the cavity portion can be enlarged, whereby stress can be more reliably mitigated.

Preferably, in one exemplary embodiment of the coil component, a ratio of metal oxide contained in the first coil conductor layer is lower than a ratio of metal oxide contained in the second coil conductor layer.

According to the exemplary embodiment, the specific resistance of the first coil conductor layer can easily be made smaller than the specific resistance of the second coil conductor layer.

Preferably, in one exemplary embodiment of the coil component, in the section, a thickness of the second coil conductor layer is smaller than a thickness of the first coil conductor layer.

According to the exemplary embodiment, the thickness of the second coil conductor layer having large specific resistance can be made small, whereby an increase in specific resistance of the coil wire can be suppressed.

According to the coil component of one aspect of the present disclosure, specific resistance of a coil can be reduced, and stress can reliably be mitigated.

DETAILED DESCRIPTION

Hereinafter, a coil component that is one aspect of the present disclosure will be described in detail by illustrated exemplary embodiments. Note that the drawings include some schematic drawings, and they sometimes do not reflect actual dimensions or ratios.

First Exemplary Embodiment (Configuration)

Figure 1:
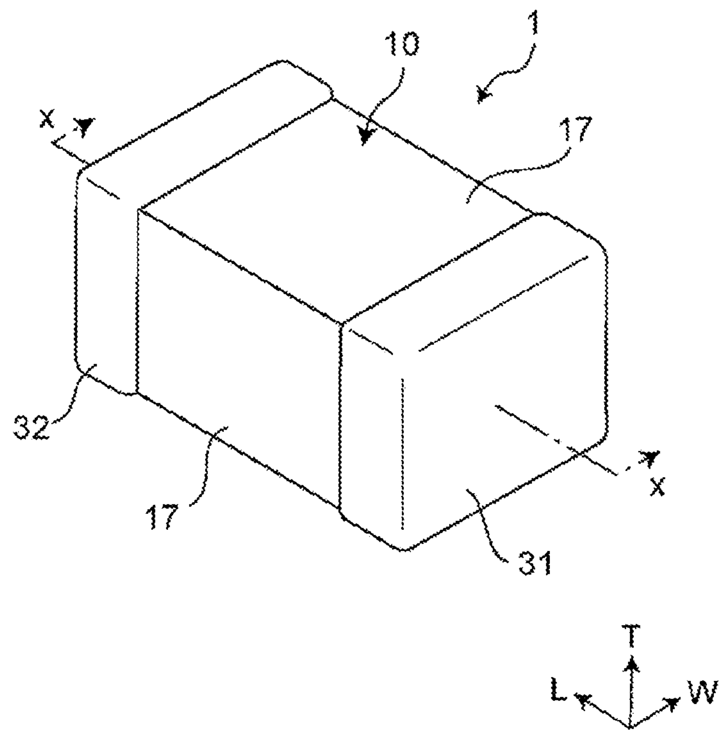
FIG. 1 is a perspective view illustrating a first exemplary embodiment of a coil component.
Figure 2:
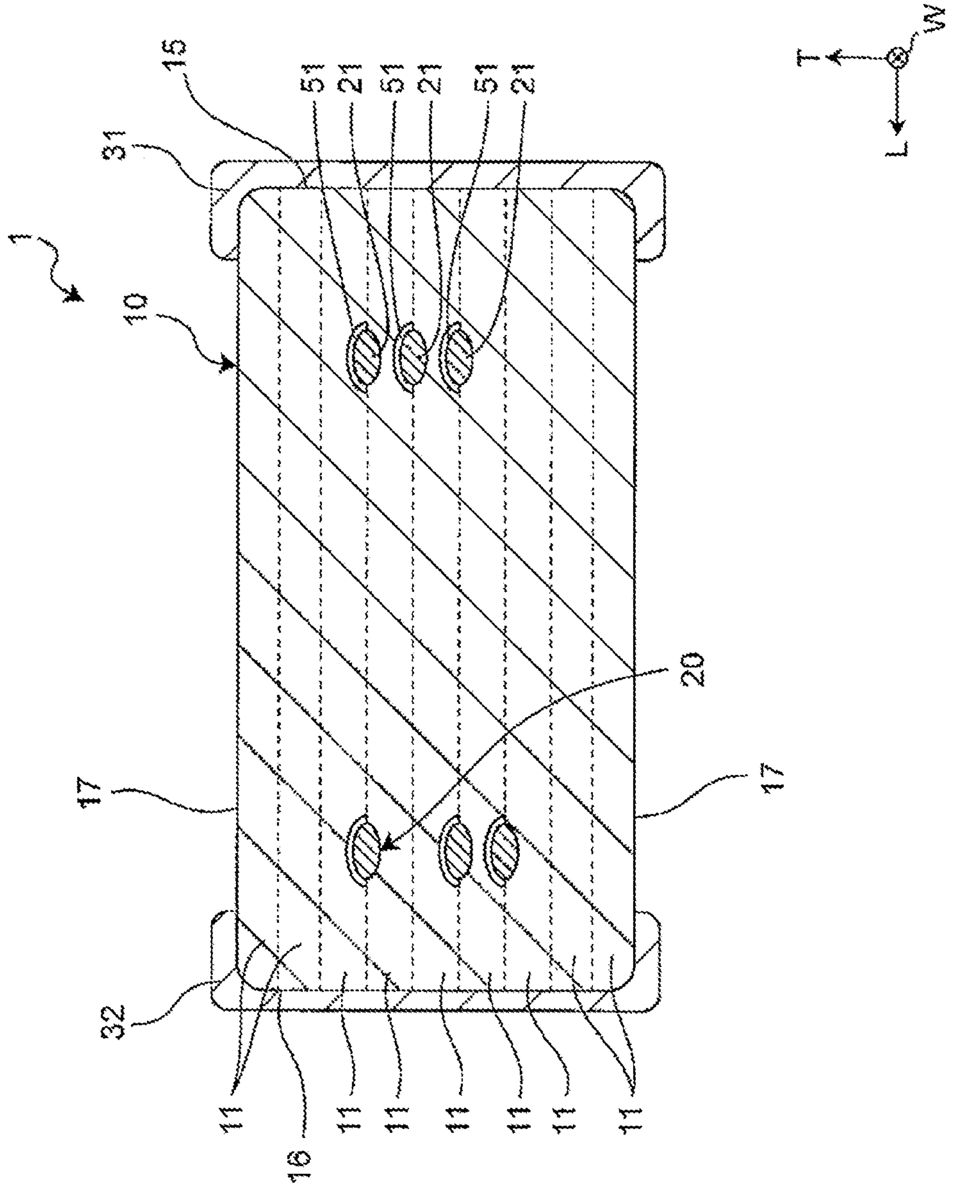
FIG. 2 is an X-X sectional view of the coil component in FIG. 1.
Figure 3:
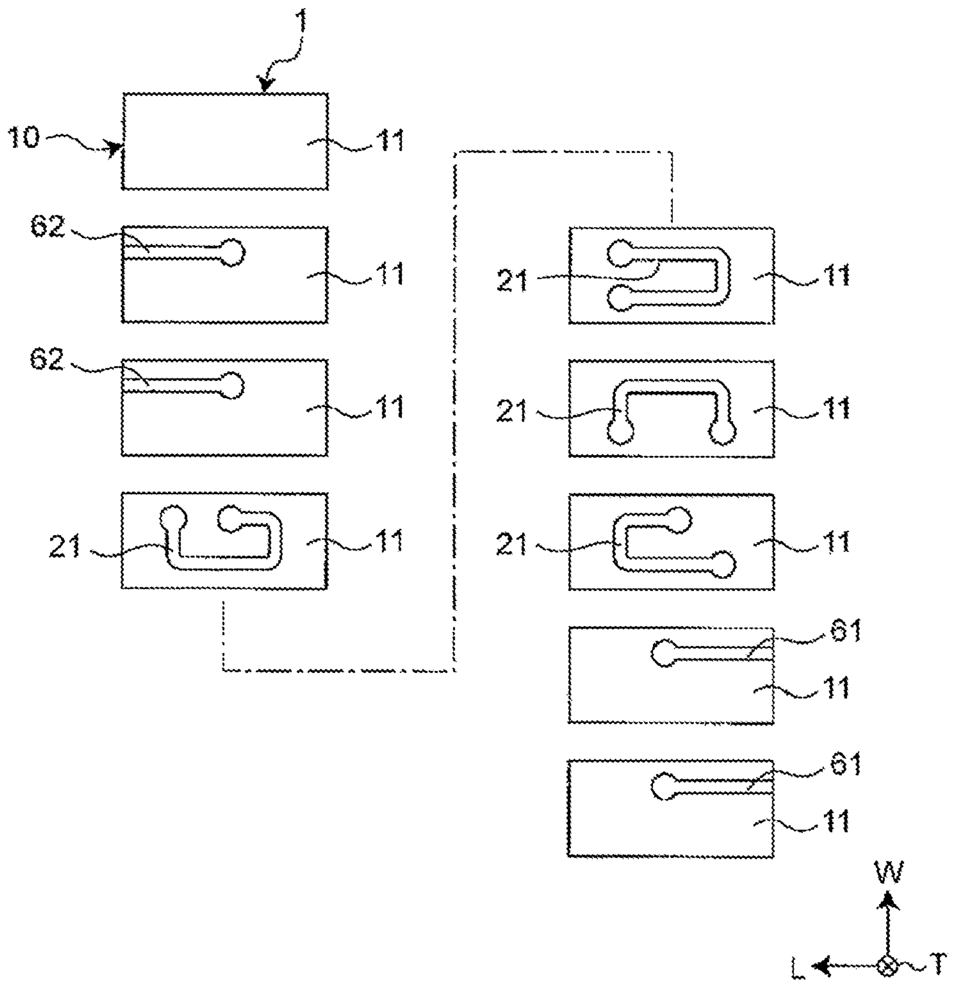
FIG. 3 is an exploded plan view of the coil component.

FIG. 1 is a perspective view illustrating a first exemplary embodiment of a coil component. FIG. 2 is an X-X sectional view of FIG. 1, and is an LT-sectional view passing through a center of the coil component in a W-direction. FIG. 3 is an exploded plan view of the coil component, and illustrates a view along a T-direction from the lower drawing to the upper drawing. Note that an L-direction is a length direction of a coil component 1, the W-direction is a width direction of the coil component 1, and the T-direction is a height direction of the coil component 1. Hereinafter, a forward direction of the T-direction is referred to as an upper side, and a reverse direction of the T-direction is referred to as a lower side.

As illustrated in FIG. 1, FIG. 2, and FIG. 3, the coil component 1 includes a base body 10, a coil 20 disposed inside the base body 10, and a first external electrode 31 and a second external electrode 32 that are disposed on surfaces of the base body 10, and are electrically connected to the coil 20.

The coil component 1 is electrically connected to wiring of a not-illustrated circuit board via the first external electrode 31 and the second external electrode 32. The coil component 1 is used as, for example, a noise rejection filter, and is used in an electronic device such as a personal computer, a digital versatile disk (DVD) player, a digital camera, a television (TV), a mobile phone, and automotive electronics.

The base body 10 is formed in a substantially rectangular parallelpiped. A surface of the base body 10 includes a first end surface 15, a second end surface 16 located on a side opposite to the first end surface 15, and four side surfaces 17 located between the first end surface 15 and the second end surface 16. The first end surface 15 and the second end surface 16 face each other in the L-direction.

The base body 10 includes a plurality of magnetic layers 11. The magnetic layers 11 are laminated in the T-direction serving as a first direction. Each magnetic layer 11 is formed from, for example, a magnetic material such as a Ni—Cu—Zn base ferrite material. A thickness of each magnetic layer 11 is, for example, in a range of 5 μm to 30 μm, inclusive. Note that the base body 10 may include a non-magnetic layer in part.

The first external electrode 31 covers a whole surface of the first end surface 15 of the base body 10, and an end of the side surface 17 closer to the first end surface 15 of the base body 10. The second external electrode 32 covers a whole surface of the second end surface 16 of the base body 10, and an end of the side surface 17 closer to the second end surface 16 of the base body 10. The first external electrode 31 is electrically connected to a first end of the coil 20, and the second external electrode 32 is electrically connected to a second end of the coil 20. Note that, the first external electrode 31 may have an L shape formed straddling the first end surface 15 and one side surface 17, and the second external electrode 32 may have an L shape formed straddling the second end surface 16 and one side surface 17.

The coil 20 is wound spirally along the T-direction. The coil 20 is formed from, for example, a conductive material such as Ag or Cu. The coil 20 includes a plurality of coil wires 21 and a plurality of pull-out conductor layers 61, 62.

Two first pull-out conductor layers 61, the plurality of the coil wires 21, and two second pull-out conductor layers 62 are laminated in order in the T-direction, and are electrically connected to each other in order by via conductors. The plurality of coil wires 21 are sequentially connected in the T-direction to form a spiral along the T-direction. The first pull-out conductor layers 61 expose from the first end surface 15 of the base body 10, and are connected to the first external electrode 31, and the second pull-out conductor layers 62 expose from the second end surface 16 of the base body 10, and are connected to the second external electrode 32. Note that the number of each of the first and second pull-out conductor layers 61, 62 is not particularly limited, and may be one.

Each coil wire 21 extends along a plane orthogonal to the T-direction. Each coil wire 21 is formed into a shape wound less than one turn on the plane. Each of the first and second pull-out conductor layers 61, 62 is formed in a linear shape. A thickness of each coil wire 21 is, for example, in a range of 10 μm to 40 μm, inclusive. A thickness of each of the first and second pull-out conductor layers 61, 62 is, for example, 30 μm, but may be thinner than the thickness of the coil wire 21.

Each coil wire 21 is interposed between two magnetic layers 11. In other words, the coil wires 21 and the magnetic layers 11 are alternately laminated. The coil wire 21 is interposed between two magnetic layers 11, so that a shape of the coil wire 21 is elliptical in a section orthogonal to the extending direction (winding direction) of the coil wire 21.

The first and second pull-out conductor layers 61, 62 are respectively disposed in layers different from the coil wires 21. Each of the first and second pull-out conductor layers 61, 62 is interposed between two magnetic layers 11.

Figure 4:
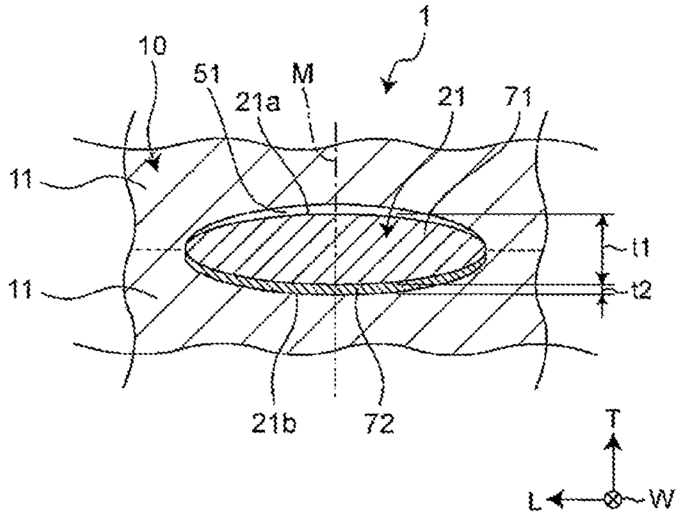
FIG. 4 is an enlarged sectional view of a periphery of a coil wire.

FIG. 4 is an enlarged sectional view of a periphery of one coil wire 21 in FIG. 2. As illustrated in FIG. 4, the coil wire 21 includes a first coil conductor layer 71 and a second coil conductor layer 72 that are laminated in the first direction. According to the above configuration, in the coil wire, the first coil conductor layer 71 and the second coil conductor layer 72 are laminated in the first direction, whereby specific resistance of the coil can be reduced.

The specific resistance of the first coil conductor layer 71 is smaller than the specific resistance of the second coil conductor layer 72. Here, it is difficult to obtain an amplitude relationship between the specific resistance of the first coil conductor layer 71 and the specific resistance of the second coil conductor layer 72, by directly measuring the specific resistance of the first coil conductor layer 71 and the specific resistance of the second coil conductor layer 72. However, without being limited to this, by analyzing composition of the first coil conductor layer 71 and composition of the second coil conductor layer 72, the amplitude relationship between the specific resistance of the first coil conductor layer 71 and the specific resistance of the second coil conductor layer 72 may be indirectly derived from the composition of the first coil conductor layer 71 and the composition of the second coil conductor layer 72. Alternatively, by measuring grain sizes (liquid crystal grain sizes) of the first coil conductor layer 71 and the second coil conductor layer 72, the amplitude relationship between the specific resistance of the first coil conductor layer 71 and the specific resistance of the second coil conductor layer 72 may be indirectly derived from those grain sizes. For example, when the grain size is small, the specific resistance becomes large.

In a section orthogonal to the extending direction of the coil wire 21 (hereinafter, referred to as a transverse section of the coil wire 21), the second coil conductor layer 72 is adjacent to one side of the first coil conductor layer 71 in the T-direction, and a cavity portion 51 is disposed in at least a part between the first coil conductor layer 71 and a magnetic layer 11 adjacent to the other side of the first coil conductor layer 71 in the T-direction. In this exemplary embodiment, the one side in the T-direction is referred to as a reverse direction in the T-direction (that is, lower side), and the other side in the T-direction is referred to as a forward direction in the T-direction that is, upper side).

Specifically, an upper surface 21*a* of the coil wire 21 is spaced away from the magnetic layer 11 on the upper side, and the cavity portion 51 is provided between the upper surface 21*a* of the coil wire 21 and the magnetic layer 11 on the upper side. A lower surface 21*b* of the coil wire 21 is brought into contact with the magnetic layer 11 on the lower side.

In the transverse section of the coil wire 21, a shape of the first coil conductor layer 71 is elliptical, and the second coil conductor layer 72 has a film shape. The second coil conductor layer 72 covers all of the lower surface of the first coil conductor layer 71. A lateral width of the second coil conductor layer 72 is the same as a lateral width of the first coil conductor layer 71. A lower surface of the second coil conductor layer 72 is brought into contact with the magnetic layer 11 on the lower side.

According the above configuration, the cavity portion 51 is disposed in at least a part between the first coil conductor layer 71 and the magnetic layer 11 on the upper side, whereby mechanical junction with the magnetic layer 11 can be cut in at least a part of the upper surface 21*a* of the coil wire 21. Accordingly, stress generated due to a difference in linear expansion coefficient between the magnetic layer 11 and the coil wire 21 can reliably be mitigated. This can cancel degradation of inductance (impedance value) due to internal stress, and endure a high impedance value (inductance value).

Further, the lower surface 21*b* of the coil wire 21 is brought into contact with the magnetic layer 11 on the lower side, whereby a position of the coil wire 21 with respect to the base body 10 can be made stable.

Preferably, in the transverse section of the coil wire 21, a ratio of a sectional area of the second coil conductor layer 72 to a sectional area of the first coil conductor layer 71 is less than or equal to 100%. According to the above configuration, the sectional area of the second coil conductor layer 72 whose specific resistance is large can be reduced, whereby an increase in specific resistance of the coil wire 21 can be suppressed.

Preferably, in the transverse section of the coil wire 21, a thickness t2 of the second coil conductor layer 72 is smaller than a thickness t1 of the first coil conductor layer 71. Here, the thicknesses t1, t2 are referred to as thicknesses on a center line M of the coil wire 21 in a lateral width direction, in the transverse section of the coil wire 21. According to the above configuration, the thickness of the second coil conductor layer 72 whose specific resistance is large can be reduced, whereby an increase in specific resistance of the coil wire 21 can be suppressed.

Preferably, a ratio of metal oxide contained in the first coil conductor layer 71 is lower than a ratio of metal oxide contained in the second coil conductor layer 72. Specifically, the first coil conductor layer 71 and the second coil conductor layer 72 include, for example, Ag (silver) as a primary component. For example, the metal oxide is one or more oxides among Ca (calcium), Mg (magnesium), Mn (manganese), Fe (iron), Al (aluminum), Y (yttrium), Dy (dysprosium), Ni (nickel), Nb (niobium), Zr (zirconia), and Bi (bismuth). According to the above configuration, the specific resistance of the first coil conductor layer 71 can easily be made smaller than the specific resistance of the second coil conductor layer 72. Note that the first coil conductor layer 71 may not contain the metal oxide.

(Manufacturing Method)

Next, an example of a manufacturing method of the coil component 1 will be described with reference to FIG. 5A to FIG. 5E. Each of FIG. 5A to FIG. 5E illustrates the LT section orthogonal to the extending direction of the coil wire 21.

First, a green magnetic layer, a green first coil conductor layer, a green second coil conductor layer, and a to-be-burned layer are prepared.

The green magnetic layer is in a state of the magnetic layer 11 before being fired. The green magnetic layer is formed from a magnetic sheet. The green magnetic layer contains a magnetic material. The magnetic material is not particularly limited, but for example, a ferrite material containing $Fe_2O_3$, ZnO, CuO, and NiO can be used.

The green first coil conductor layer is in a state of the first coil conductor layer 71 before being fired, and the green second coil conductor layer is in a state of the second coil conductor layer 72 before being fired. The green first coil conductor layer and the green second coil conductor layer are formed from a conductive paste. The green first coil conductor layer and the green second coil conductor layer include the above metal oxide having metal particles such as Ag or Cu as a primary component. A ratio of metal oxide contained in the green first coil conductor layer is lower than a ratio of metal oxide contained in the green second coil conductor layer. Preferably, a ratio of metal oxide in the second coil conductor layer to the primary component is in a range of 0.02 wt % to 1.0 wt %, inclusive.

As described above, a ratio of metal oxide in the green second coil conductor layer is larger than a ratio of metal oxide in the green first coil conductor layer. Therefore a firing start temperature of the green second coil conductor layer is made higher than a firing start temperature of the green first coil conductor layer, whereby firing of the green second coil conductor layer can be delayed relative to firing of the green first coil conductor layer.

The to-be-burned layer is burned down by firing. The to-be-burned layer is formed from a resin material, for example. Note that the to-be-burned layer may be formed from any material, as long as the material is burned down by firing.

Figure 5A:
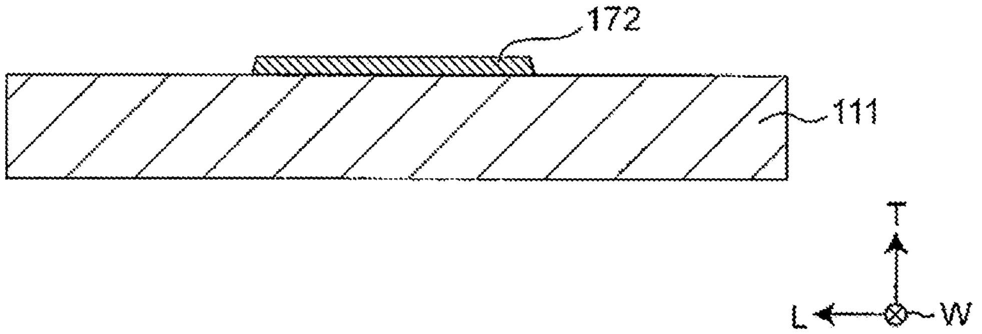
FIG. 5A is a sectional view illustrating a manufacturing method of the coil component.
Figure 5B:
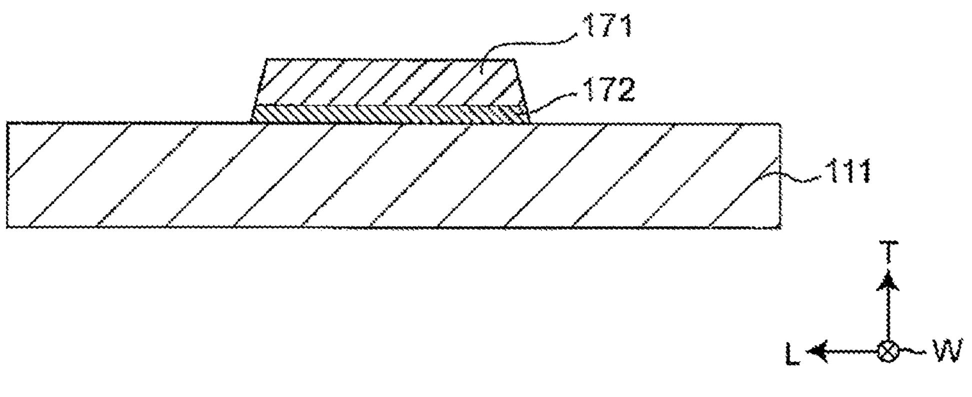
FIG. 5B is a sectional view illustrating the manufacturing method of the coil component.

As illustrated in FIG. 5A, a green second coil conductor layer 172 is printed and laminated on a first green magnetic layer 111. As illustrated in FIG. 5B, a green first coil conductor layer 171 is printed and laminated on the green second coil conductor layer 172.

Figure 5C:
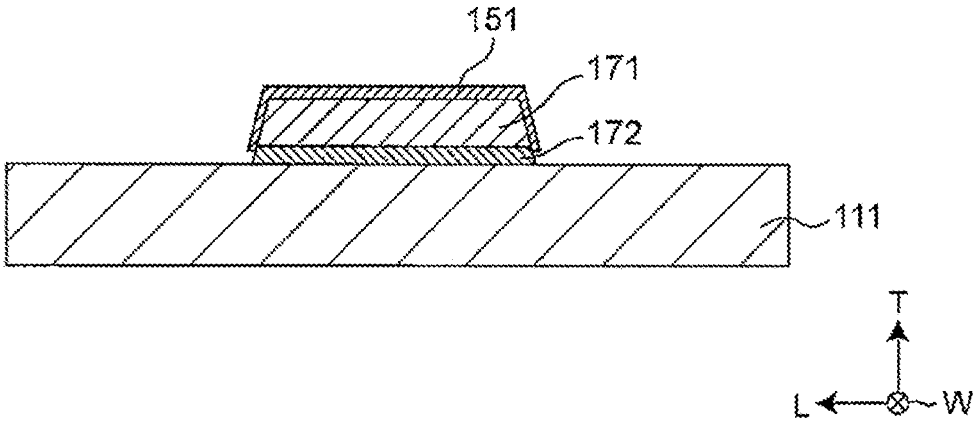
FIG. 5C is a sectional view illustrating the manufacturing method of the coil component.
Figure 5D:
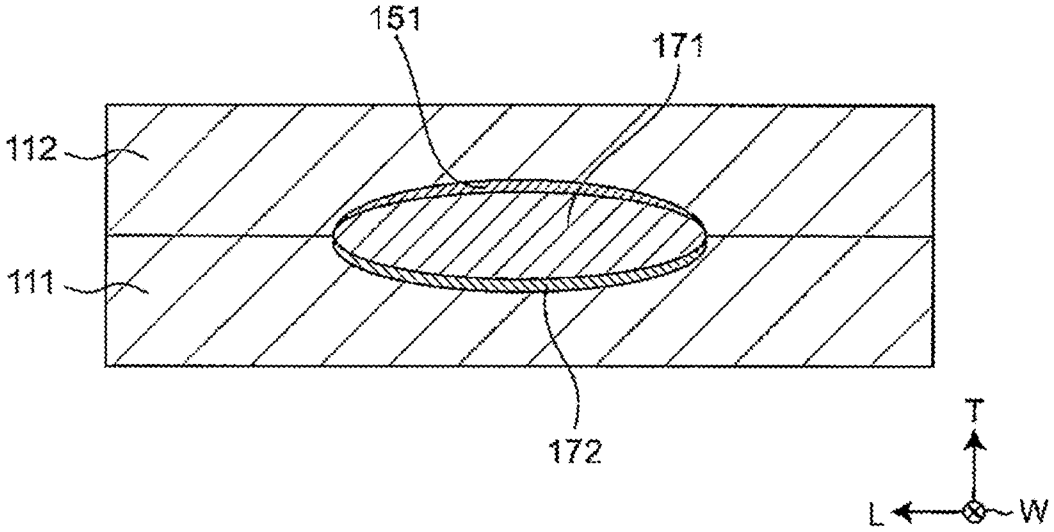
FIG. 5D is a sectional view illustrating the manufacturing method of the coil component.
Figure 5E:
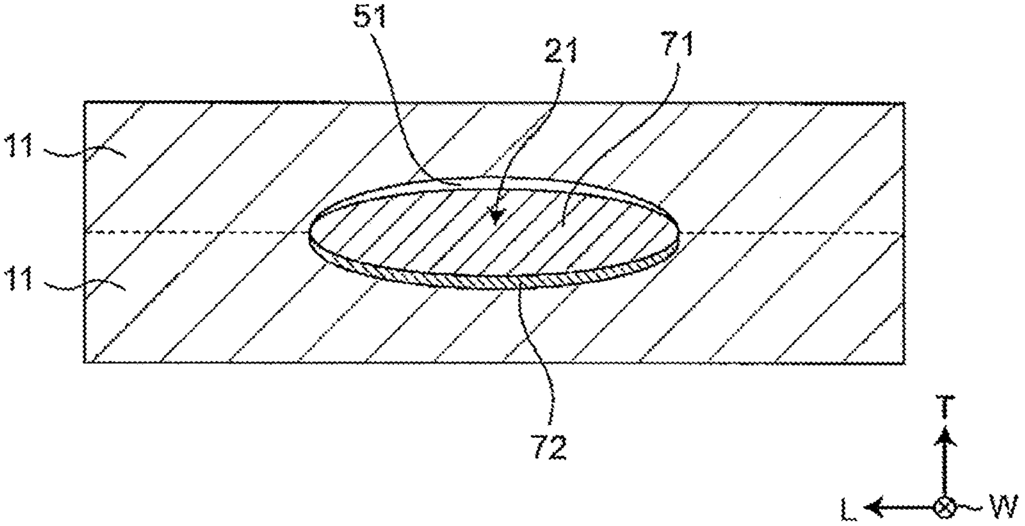
FIG. 5E is a sectional view illustrating the manufacturing method of the coil component.

As illustrated in FIG. 5C, a to-be-burned layer 151 is printed and laminated to cover an upper surface and side surfaces of the green first coil conductor layer 171. As illustrated in FIG. 5D, a second green magnetic layer 112 is laminated on the first green magnetic layer 111 to cover the green first coil conductor layer 171, the green second coil conductor layer 172, and the to-be-burned layer 151. At this time, by pressing the second green magnetic layer 112, the green first coil conductor layer 171, the green second coil conductor layer 172, and the to-be-burned layer 151 are deformed from a trapezoid into an elliptic as a whole.

By repeating the above steps, a green laminate in which a plurality of green magnetic layers, a plurality of green first coil conductor layers, and a plurality of green second coil conductor layers are laminated is formed.

Thereafter, the green laminate is fired. Hereinafter, a firing step will be described in detail.

First, at a firing initial stage (150° C. to 300° C.), the to-be-burned layer 151 is burned down. This eliminates bonding force between the green first coil conductor layer 171 and the second green magnetic layer 112. As a result, a starting point of the slight cavity portion 51 is produced at an interface between the green first coil conductor layer 171 and the second green magnetic layer 112.

Thereafter, when a firing temperature is raised (300° C. to 500° C.), the green first coil conductor layer 171 is fired first, and contracts. At this time, the green second coil conductor layer 172 is not changed. In other words, bonding force between the green second coil conductor layer 172 and the first green magnetic layer 111 is maintained. On the other hand, since the bonding force between the green first coil conductor layer 171 and the second green magnetic layer 112 is lost, the green first coil conductor layer 171 contracts while being biased toward the green second coil conductor layer 172, thereby expanding the cavity portion 51.

When the firing temperature is further raised (450° C. to 700° C.), the green second coil conductor layer 172 is fired and contracts. At this moment, the bonding force between the green second coil conductor layer 172 and the first green magnetic layer 111 is maintained, and therefore a cavity portion is hardly formed at an interface therebetween. On the other hand, the green first coil conductor layer 171 that is fired earlier is attracted by the green second coil conductor layer 172, thereby expanding a space of the cavity portion 51.

When the firing temperature is further raised (800° C. to 950° C.), the first and second green magnetic layers 111, 112 are fired and contract. At this moment, the space of the cavity portion 51 shrinks, but at a stage of firing completion, the cavity portion 51 remains.

Through the firing step described above, as illustrated in FIG. 5E, the to-be-burned layer 151 is burned down to form the cavity portion 51, the green magnetic layers 111, 112 are fired to form magnetic layers 11, the green first coil conductor layer 171 is fired to form a first coil conductor layer 71, and the green second coil conductor layer 172 is fired to form a second coil conductor layer 72. With those steps, the coil component 1 illustrated in FIG. 2 is manufactured.

As described above, the bonding force between the green first coil conductor layer 171 and the second green magnetic layer 112 and the bonding force between the green second coil conductor layer 172 and the first green magnetic layer 111 are made different from each other. This provides the cavity portion 51 on the upper surface 21*a* of the coil wire 21 whose bonding force is weak, and provides no cavity portion on the lower surface 21*b* of the coil wire 21 whose bonding force is strong.

Note that, as a method in which the difference is provided to the bonding force, that is, the method in which the firing temperature of the green first coil conductor layer 171 and the firing temperature of the green second coil conductor layer 172 are made different from each other, the difference can be provided depending on not only the amount of the ratio of the metal oxide, but also a size of an average particle diameter of the metal particles, presence of coating on surfaces of the metal particles, or an amount of a binder. For example, the firing temperature can be raised by increasing the average particle diameter of the metal particles, coating the surfaces of the metal particles, or increasing the amount of the binder.

Note that the coil component 1 of the first exemplary embodiment is manufactured by the manufacturing method from FIG. 5A to FIG. 5E, but the present disclosure is not limited to this method. The coil component 1 may be manufactured by other different manufacturing methods. That is, as the method for forming the start point of the cavity portion 51, the above-described to-be-burned layer 151 is used, but the present disclosure is not limited to this method. Rather, any method can be used.

In the first exemplary embodiment, the cavity portion 51 is provided on the upper surface 21*a* of the coil wire 21, but the cavity portion 51 may be provided on the lower surface 21*b* of the coil wire 21.

(Modifications)

Figure 6:
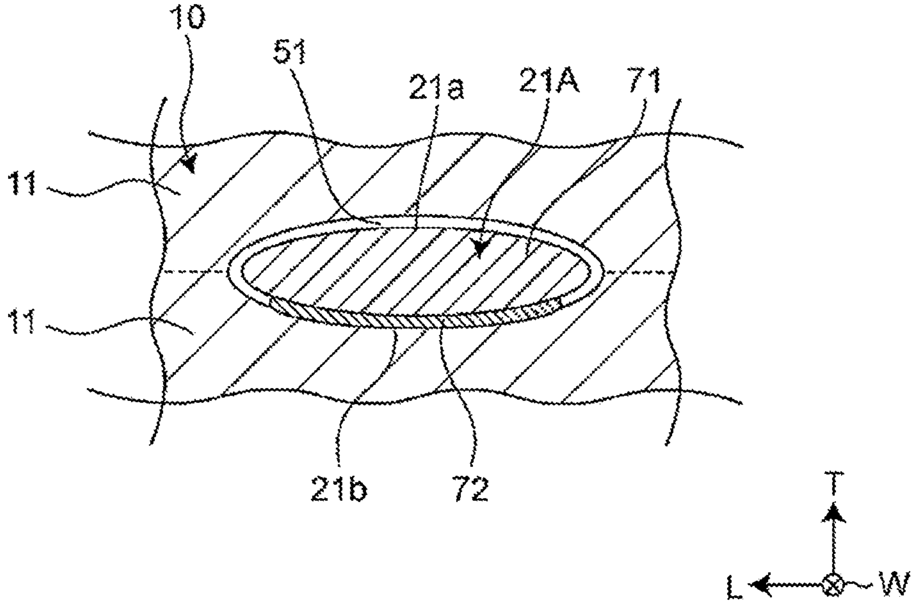
FIG. 6 is a sectional view illustrating a modification of the coil wire.

FIG. 6 is a schematic sectional view illustrating a modification of the coil wire 21 in FIG. 4. As illustrated in FIG. 6, in this coil wire 21A, the second coil conductor layer 72 covers a part of the lower surface of the first coil conductor layer 71. In other words, a lateral width of the second coil conductor layer 72 is smaller than a lateral width of the first coil conductor layer 71. A part that is not covered by the second coil conductor layer 72 in the lower surface of the first coil conductor layer 71 is spaced away from the magnetic layer 11 on the lower side. Therefore, the cavity portion 51 is also present between the first coil conductor layer 71 and the magnetic layer 11 on the lower side. As described above, the cavity portion 51 extends from the upper surface 21*a* to the part of the lower surface 21*b* of the coil wire 21A. Accordingly, the cavity portion 51 can be enlarged, whereby stress can be mitigated more. The area of the second coil conductor layer 72 can be reduced, whereby an increase in specific resistance of the coil wire 21A can be suppressed.

Figure 7:
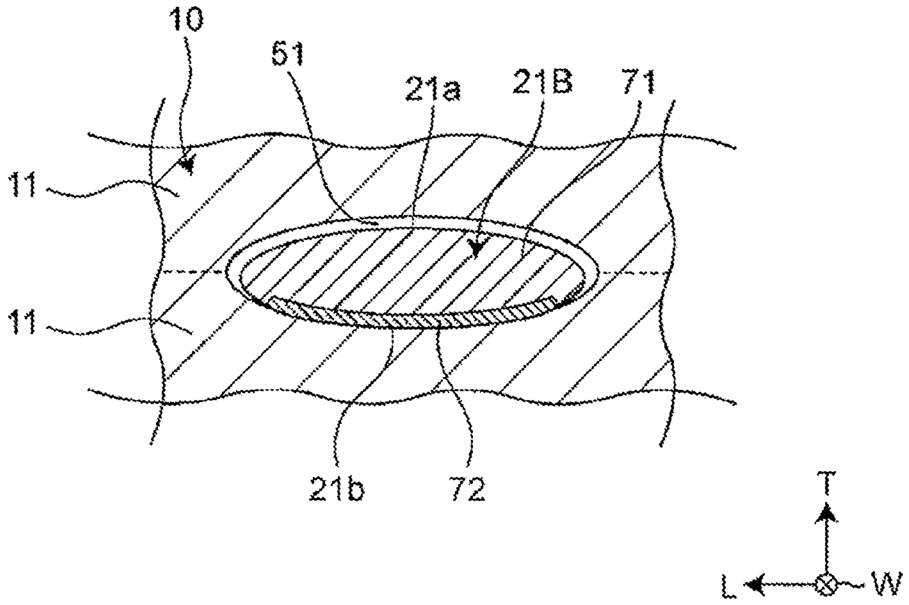
FIG. 7 is a sectional view illustrating a modification of the coil wire.

FIG. 7 is a schematic sectional view illustrating a modification of the coil wire 21A in FIG. 6. As illustrated in FIG. 7, in this coil wire 21B, a part that is not covered by the second coil conductor layer 72 in the lower surface of the first coil conductor layer 71 is brought into contact with the magnetic layer 11 on the lower side. That is, lateral both sides of the second coil conductor layer 72 are covered by the first coil conductor layer 71. In all of the lower surface 21*b* of the coil wire 21B, the part in contact with the magnetic layer 11 on the lower side is increased. Accordingly, the area of the first coil conductor layer 71 can be increased, whereby an increase in specific resistance of the coil wire 21B can be suppressed.

Figure 8:
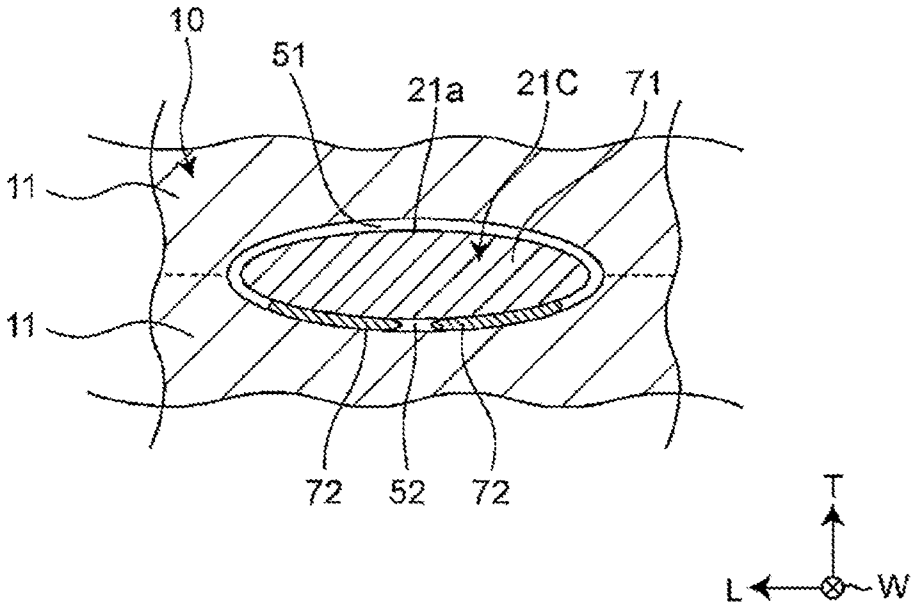
FIG. 8 is a sectional view illustrating a modification of the coil wire.

FIG. 8 is a schematic sectional view illustrating a modification of the coil wire 21A in FIG. 6. As illustrated in FIG. 8, in this coil wire 21C, the second coil conductor layer 72 is divided into a plurality of parts, and the cavity portion 52 is present between the adjacent parts. Specifically, the second coil conductor layer 72 is divided into the plurality of parts in a direction perpendicular to the extending direction of the coil wire. Accordingly, regions of the cavity portions 51, 52 can be enlarged, whereby stress can be more reliably mitigated.

Note that, in a transverse section of the coil wire 21C, a ratio of a sectional area of the second coil conductor layer 72 to a sectional area of the first coil conductor layer 71 is preferably less than or equal to 100%. The sectional area of the second coil conductor layer 72 means a total sum of sectional areas of the plurality of parts.

Figure 9:
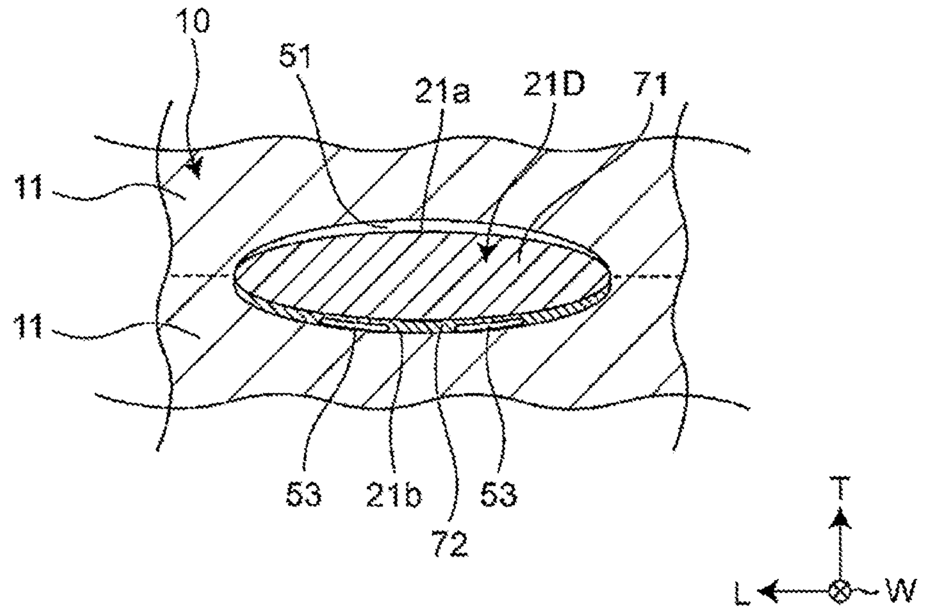
FIG. 9 is a sectional view illustrating a modification of the coil wire.

FIG. 9 is a schematic sectional view illustrating a modification of the coil wire 21 in FIG. 4. As illustrated in FIG. 9, in this coil wire 21D, the cavity portion 53 is disposed in a part between the second coil conductor layer 72 and the magnetic layer 11 on the lower side, which is adjacent to the second coil conductor layer 72 from below. Accordingly, regions of the cavity portions 51, 53 can be enlarged, whereby stress can be more reliably mitigated. Note that, in the transverse section of the coil wire 21D, one or more cavity portions 53 may be disposed.

The sectional area of the cavity portion 51 between the first coil conductor layer 71 and the magnetic layer 11 on the upper side, which is adjacent to the first coil conductor layer 71, is larger than the sectional area of the cavity portion 53 between the second coil conductor layer 72 and the magnetic layer 11 on the lower side, which is adjacent to the second coil conductor layer 72. The cavity portion 53 is divided into a plurality of parts, and the sectional area of the cavity portion 53 means a total sum of sectional areas of the plurality of parts. Accordingly, the sectional area of the cavity portion is made different between one side and the other side of the first direction of the coil wire, thereby making a mitigation degree of stress stable, and making the impedance value/inductance value stable.

Figure 10:
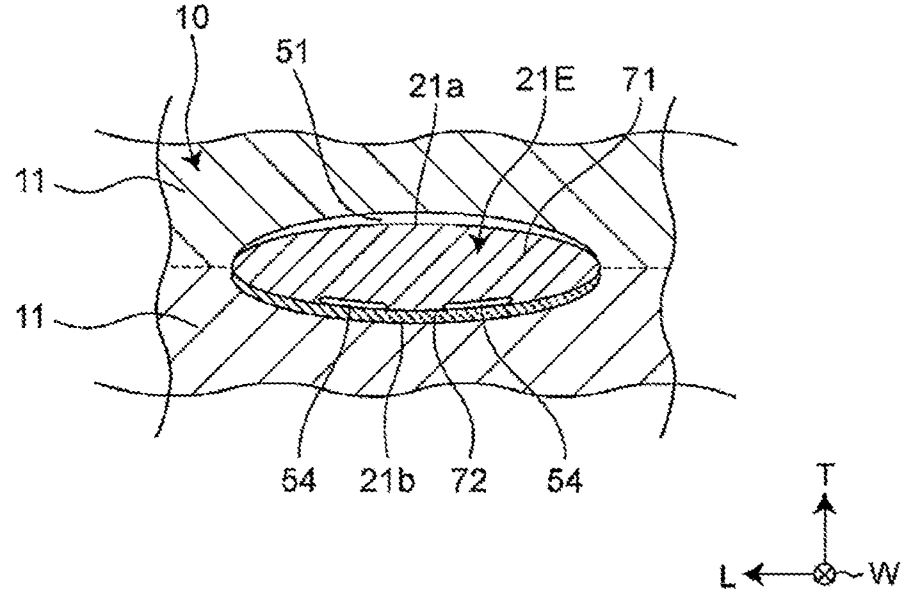
FIG. 10 is a sectional view illustrating a modification of the coil wire.

FIG. 10 is a schematic sectional view illustrating a modification of the coil wire 21 in FIG. 4. As illustrated in FIG. 10, in this coil wire 21E, a cavity portion 54 is disposed in a part between the first coil conductor layer 71 and the second coil conductor layer 72. Accordingly, regions of the cavity portions 51, 54 can be enlarged, whereby stress can be more reliably mitigated. Note that, in the transverse section of the coil wire 21E, one or more cavity portions 54 may be disposed.

Second Exemplary Embodiment

Figure 11:
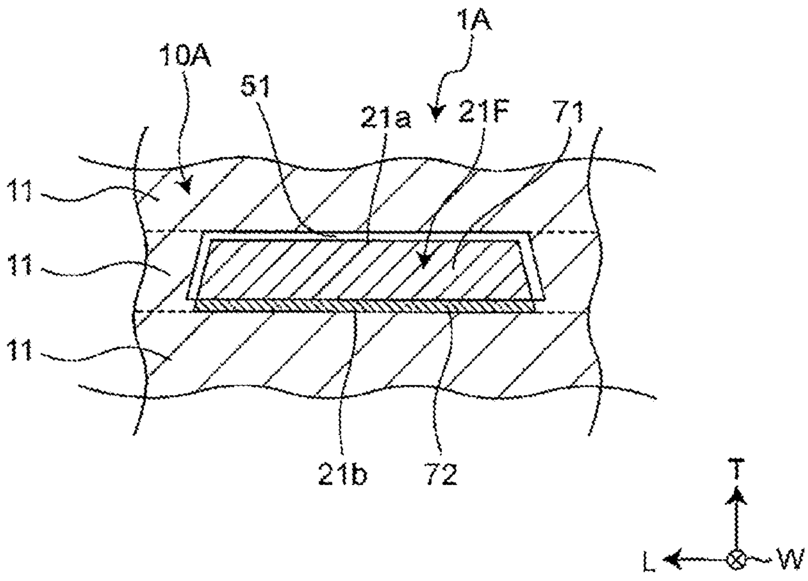
FIG. 11 is an enlarged sectional view illustrating a second exemplary embodiment of a coil component.

FIG. 11 is an enlarged perspective view illustrating a second exemplary embodiment of a coil component. The second exemplary embodiment is different from the first exemplary embodiment (FIG. 4) in a configuration of the base body and a shape of the coil wire. These different configurations will be described below.

As illustrated in FIG. 11, in a coil component 1A of the second exemplary embodiment, a base body 10A includes an intermediate magnetic layer 11 that is disposed on the same layer as a coil wire 21F, in addition to the magnetic layer 11 on the upper side and the magnetic layer 11 on the lower side, which interpose the coil wire 21F from above and below. That is, the intermediate magnetic layer 11 is interposed between the magnetic layer 11 on the upper side and the magnetic layer 11 on the lower side. Therefore, in a transverse section of coil wire 21F, a shape of the coil wire 21F is substantially a trapezoid. A cavity portion 51 is disposed between an upper surface of the first coil conductor layer 71 and the magnetic layer 11 on the upper side, and between side surfaces of the first coil conductor layer 71 and the intermediate magnetic layer 11. Accordingly, by disposing the intermediate magnetic layer 11, a thickness of the coil wire 21F can be retained, and a DC resistance value (Rdc) of the coil wire 21F can be reduced.

Next, an example of a manufacturing method of the coil component 1A will be described. When the second exemplary embodiment is compared with the first exemplary embodiment, the sheet laminating method is used in the first exemplary embodiment, but a printing and laminating method is used in the second exemplary embodiment, which is a different point.

First, a green magnetic layer, a green first coil conductor layer, a green second coil conductor layer, and a to-be-burned layer are prepared. Here, the green magnetic layer is formed from a magnetic paste, and other configurations are the same as those of the first exemplary embodiment, and therefore description thereof is omitted.

Figure 12A:
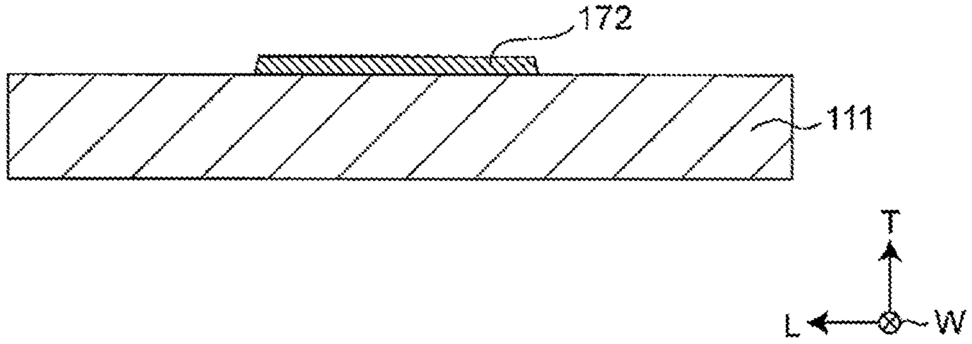
FIG. 12A is a sectional view illustrating a manufacturing method of the coil component.
Figure 12B:
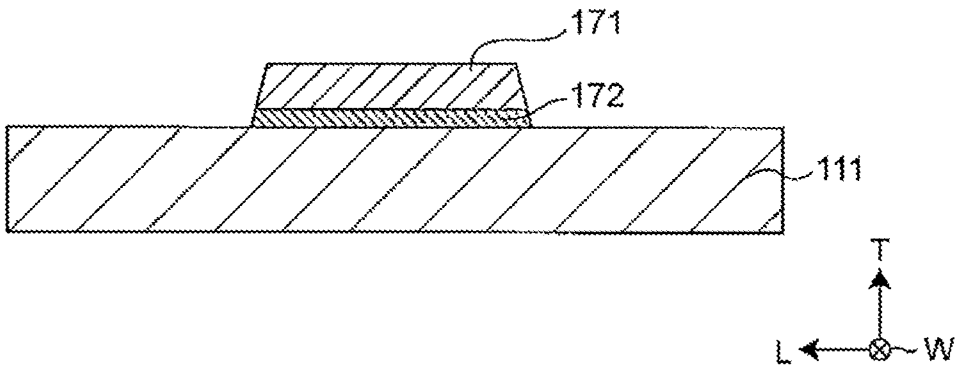
FIG. 12B is a sectional view illustrating the manufacturing method of the coil component.

As illustrated in FIG. 12A, a green second coil conductor layer 172 is printed and laminated on a first green magnetic layer 111. As illustrated in FIG. 12B, a green first coil conductor layer 171 is printed and laminated on the green second coil conductor layer 172.

Figure 12C:
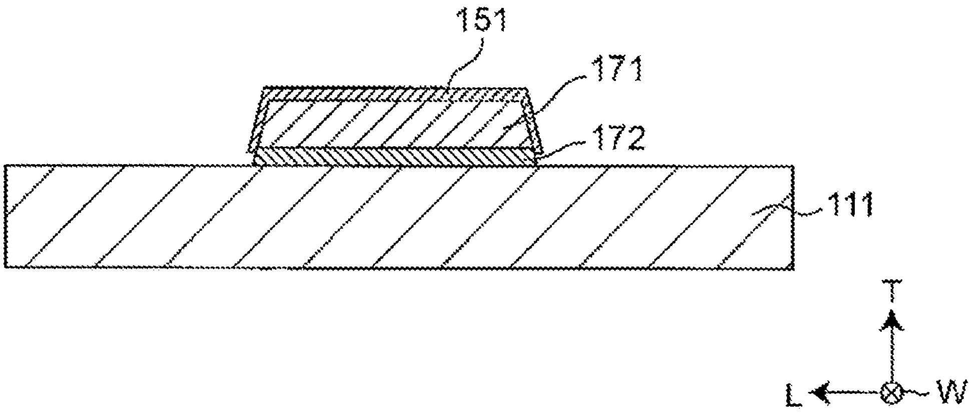
FIG. 12C is a sectional view illustrating the manufacturing method of the coil component.
Figure 12D:
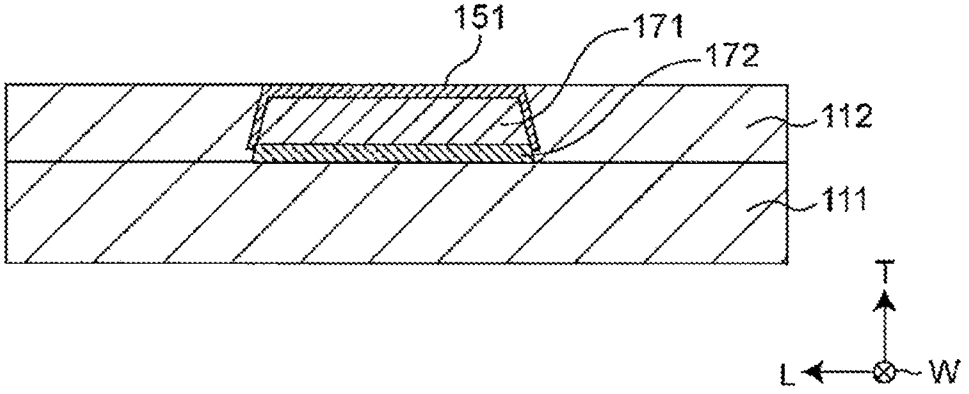
FIG. 12D is a sectional view illustrating the manufacturing method of the coil component.

As illustrated in FIG. 12C, a to-be-burned layer 151 is printed and laminated to cover an upper surface and side surfaces of the green first coil conductor layer 171. As illustrated in FIG. 12D, a second green magnetic layer 112 is printed and laminated on the first green magnetic layer 111 to be on the same layer as the green first coil conductor layer 171, the green second coil conductor layer 172, and the to-be-burned layer 151.

Figure 12E:
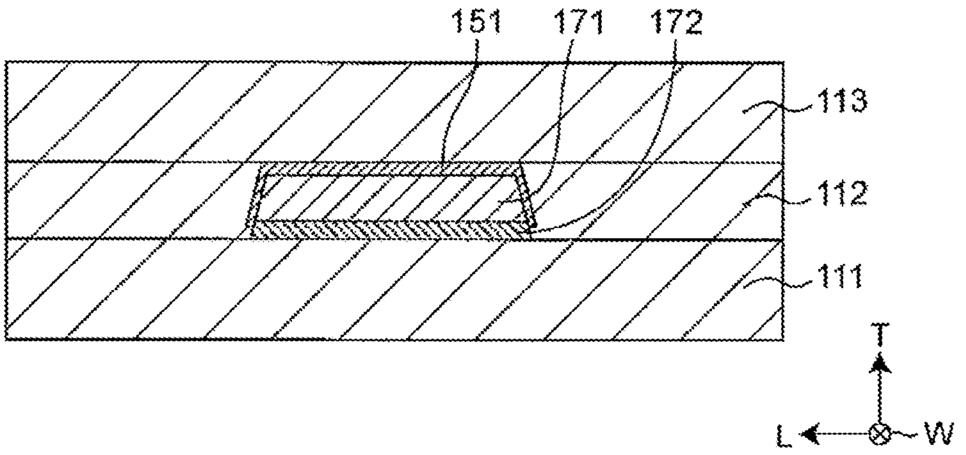
FIG. 12E is a sectional view illustrating the manufacturing method of the coil component.

As illustrated in FIG. 12E, a third green magnetic layer 113 is printed and laminated on the second green magnetic layer 112. At this time, despite the fact that the third green magnetic layer 113 is laminated, since the second green magnetic layer 112 is provided, a combined shape of the green first coil conductor layer 171, the green second coil conductor layer 172, and the to-be-burned layer 151 can be retained as the substantial trapezoid.

By repeating the above steps, a green laminate in which a plurality of green magnetic layers, a plurality of green first coil conductor layers, and a plurality of green second coil conductor layers are laminated is formed. Thereafter, the green laminate is fired. This firing step is the same as that in the first exemplary embodiment, and therefore description thereof is omitted.

Figure 12F:
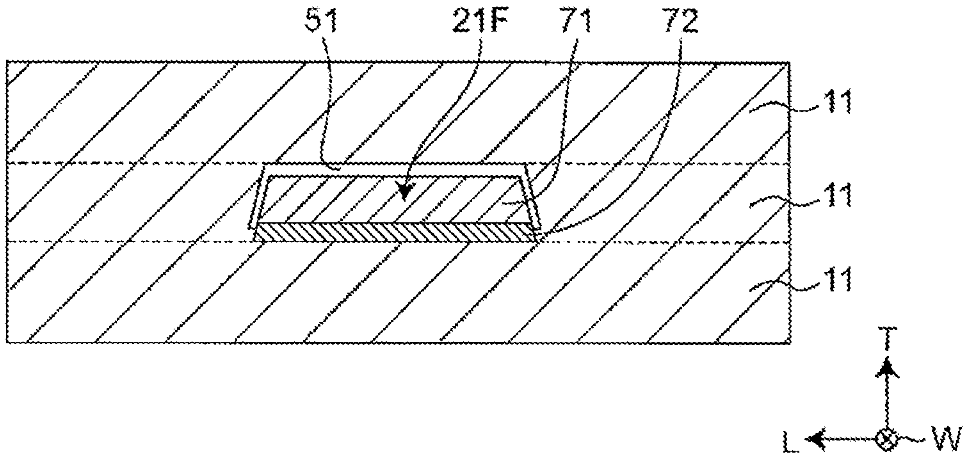
FIG. 12F is a sectional view illustrating the manufacturing method of the coil component.

As illustrated in FIG. 12F, the to-be-burned layer 151 is burned down to form a cavity portion 51, the green magnetic layers 111, 112, 113 are fired to form magnetic layers 11, the green first coil conductor layer 171 is fired to form a first coil conductor layer 71, and the green second coil conductor layer 172 is fired to form a second coil conductor layer 72. With those steps, the coil component 1A illustrated in FIG. 11 is manufactured.

Note that the coil component 1A of the second exemplary embodiment is manufactured by the manufacturing method from FIG. 12A to FIG. 12F, but the present disclosure is not limited to this method. The coil component 1A may be manufactured by other different manufacturing methods. As a modification of the coil component 1A of the second exemplary embodiment, any of the modifications illustrated in FIG. 6 to FIG. 10 in the first exemplary embodiment may be adopted.

Third Exemplary Embodiment

Figure 13:
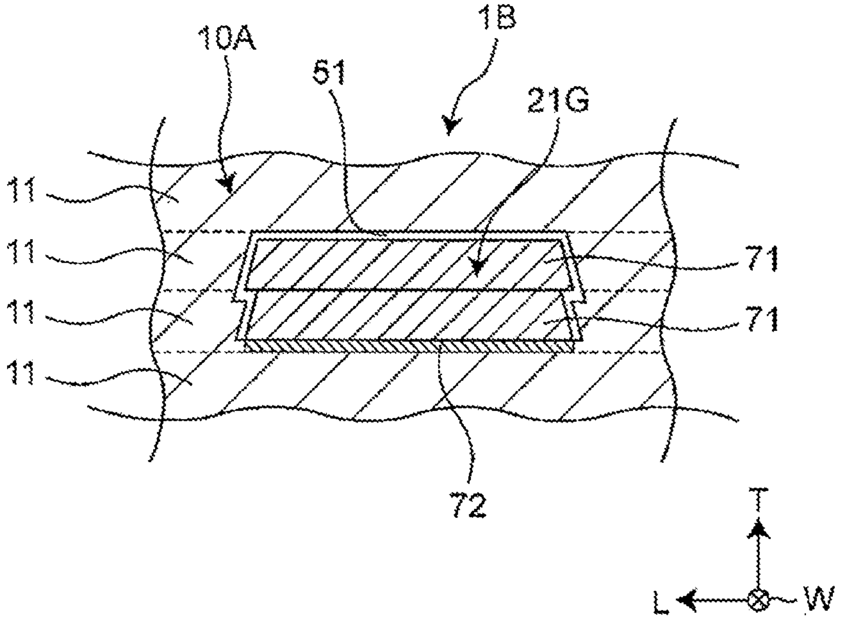
FIG. 13 is an enlarged sectional view illustrating a third exemplary embodiment of a coil component.

FIG. 13 is an enlarged sectional view illustrating a third exemplary embodiment of a coil component. The third exemplary embodiment is different from the second exemplary embodiment (FIG. 11) in a shape of the coil wire. These different configurations will be described below.

As illustrated in FIG. 13, in a coil component 1B of the third exemplary embodiment, a coil wire 21G includes a plurality of (in this exemplary embodiment, two) first coil conductor layers 71, the plurality of first coil conductor layers 71 are laminated in the T-direction, and the first coil conductor layers 71 adjacent to each other in the T-direction are brought into surface contact with each other. Specifically, in the first coil conductor layers 71 adjacent to each other in the T-direction, an upper surface of the first coil conductor layer 71 on a lower side is brought into surface contact with a lower surface of the first coil conductor layer 71 on an upper side.

The second coil conductor layer 72 is adjacent to a lower side of the plurality of first coil conductor layers 71. That is, the second coil conductor layer 72 is brought into contact with a lower surface of the first coil conductor layer 71 on the lowermost side.

A cavity portion 51 is disposed between the plurality of first coil conductor layer 71 and a magnetic layer 11 adjacent to an upper side of the plurality of first coil conductor layer 71. In other words, the cavity portion 51 faces an upper surface of the first coil conductor layer 71 on the uppermost side. Further, the cavity portion 51 extends to face side surfaces of the plurality of first coil conductor layers 71.

According to the above configuration, since the plurality of first coil conductor layers 71 are disposed, an aspect ratio of the coil wire 21G can be increased, whereby a DC resistance value (Rdc) of the coil wire 21G can be reduced. Note that the first coil conductor layers 71 is not limited to be two layers, and may be laminated in three layers or more.

Note that the present disclosure is not limited to the above exemplary embodiments, and can be changed in design within a range not departing from the gist of the present disclosure. For example, feature points of the first to third exemplary embodiments may be variously combined. An increase or decrease in the number of the coil wires or the number of the coil conductor layers can be changed in design.

What is claimed is:

1. A coil component comprising:
- a base body including a plurality of magnetic layers laminated in a first direction; and
- a coil, disposed in the base body, and including a plurality of coil wires laminated in the first direction,
- the coil wires extending along a plane orthogonal to the first direction,
- each of the coil wires including a first coil conductor layer and a second coil conductor layer laminated in the first direction,
- specific resistance of the first coil conductor layer being smaller than specific resistance of the second coil conductor layer, and
- in a cross section orthogonal to an extending direction of each of the coil wires, the second coil conductor layer being adjacent to one side of the first coil conductor layer in the first direction, and a cavity portion being disposed between the first coil conductor layer and one of the magnetic layers adjacent to another side of the first coil conductor layer in the first direction.

2. The coil component according to claim 1, wherein in the cross section, the second coil conductor layer is divided into a plurality of portions, and a cavity portion is present between the portions adjacent to each other.

3. The coil component according to claim 1, wherein
- in the cross section, a ratio of a sectional area of the second coil conductor layer to a sectional area of the first coil conductor layer is less than or equal to 100%.

4. The coil component according to claim 1, wherein
- in the cross section, a cavity portion is disposed between the second coil conductor layer and one of the magnetic layers adjacent to one side of the second coil conductor layer in the first direction.

5. The coil component according to claim 4, wherein
- in the cross section, a sectional area of the cavity portion between the first coil conductor layer and one of the magnetic layers adjacent to the first coil conductor layer is larger than a sectional area of the cavity portion between the second coil conductor layer and one of the magnetic layers adjacent to the second coil conductor layer.

6. The coil component according to claim 1, wherein in the cross section, a cavity portion is disposed between the first coil conductor layer and the second coil conductor layer.

7. The coil component according to claim 1, wherein a ratio of metal oxide contained in the first coil conductor layer is less than a ratio of metal oxide contained in the second coil conductor layer.

8. The coil component according to claim 1, wherein in the cross section, a thickness of the second coil conductor layer is smaller than a thickness of the first coil conductor layer.

9. The coil component according to claim 2, wherein in the cross section, a ratio of a sectional area of the second coil conductor layer to a sectional area of the first coil conductor layer is less than or equal to 100%.

10. The coil component according to claim 3, wherein in the cross section, a cavity portion is disposed between the second coil conductor layer and one of the magnetic layers adjacent to one side of the second coil conductor layer in the first direction.

11. The coil component according to claim 2, wherein in the cross section, a cavity portion is disposed between the first coil conductor layer and the second coil conductor layer.

12. The coil component according to claim 3, wherein in the cross section, a cavity portion is disposed between the first coil conductor layer and the second coil conductor layer.

13. The coil component according to claim 4, wherein in the cross section, a cavity portion is disposed between the first coil conductor layer and the second coil conductor layer.

14. The coil component according to claim 5, wherein in the cross section, a cavity portion is disposed between the first coil conductor layer and the second coil conductor layer.

15. The coil component according to claim 2, wherein a ratio of metal oxide contained in the first coil conductor layer is less than a ratio of metal oxide contained in the second coil conductor layer.

16. The coil component according to claim 3, wherein a ratio of metal oxide contained in the first coil conductor layer is less than a ratio of metal oxide contained in the second coil conductor layer.

17. The coil component according to claim 4, wherein a ratio of metal oxide contained in the first coil conductor layer is less than a ratio of metal oxide contained in the second coil conductor layer.

18. The coil component according to claim 2, wherein in the cross section, a thickness of the second coil conductor layer is smaller than a thickness of the first coil conductor layer.

19. The coil component according to claim 3, wherein in the cross section, a thickness of the second coil conductor layer is smaller than a thickness of the first coil conductor layer.

20. The coil component according to claim 4, wherein in the cross section, a thickness of the second coil conductor layer is smaller than a thickness of the first coil conductor layer.

* * * * *